(12) United States Patent
Suntharalingam (10) Patent No.: US 10,525,982 B2
(45) Date of Patent: Jan. 7, 2020

(54) TRACKING DIAGNOSTIC FOR CONTINUOUSLY VARIABLE VALVE SYSTEMS

(71) Applicant: GM GLOBAL TECHNOLOGY OPERATIONS LLC, Detroit, MI (US)

(72) Inventor: Piranavan Suntharalingam, Scarborough (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 395 days.

(21) Appl. No.: 15/399,228

(22) Filed: Jan. 5, 2017

(65) Prior Publication Data

US 2018/0186383 A1    Jul. 5, 2018

(51) Int. Cl.
*F02D 41/22*  (2006.01)
*B60W 50/02*  (2012.01)
*F02D 13/02*  (2006.01)

(52) U.S. Cl.
CPC ....... *B60W 50/0205* (2013.01); *F02D 41/221* (2013.01); *B60W 2050/021* (2013.01); *B60W 2050/022* (2013.01); *F02D 13/0242* (2013.01)

(58) Field of Classification Search
CPC ..... B60W 2050/021; B60W 2050/022; B60W 50/0205; F02D 13/0242; F02D 41/221; F02D 9/04; Y02T 10/40
See application file for complete search history.

(56) References Cited

U.S. PATENT DOCUMENTS

| 4,799,467 A * | 1/1989 | Ishikawa | F02D 11/105 |
| | | | 123/399 |
| 5,079,946 A * | 1/1992 | Motamedi | F02B 77/08 |
| | | | 73/114.36 |
| 9,528,445 B2 * | 12/2016 | Zeng | F02D 35/0053 |
| 9,702,298 B2 * | 7/2017 | Ossareh | F02B 37/183 |
| 2004/0187846 A1 * | 9/2004 | Hoshino | F02D 11/105 |
| | | | 123/399 |

* cited by examiner

*Primary Examiner* — Thai Ba Trieu
*Assistant Examiner* — Diem T Tran (57) ABSTRACT

A variable valve, method, and diagnostic system are provided that determine accuracy of a position of a variable valve. The variable valve, method, and diagnostic system are configured to determine a system error, the system error being the difference between a commanded position of the valve and a measured position of the valve provided through a feedback signal of the valve. The variable valve, method, and diagnostic system are further configured to determine that a diagnostic accuracy passing condition is met if: a) the system error is less than a predetermined positive error threshold and greater than a predetermined negative error threshold; b) a rate of change of the measured position exceeds a predetermined positive feedback rate threshold; or c) the rate of change of the measured position is less than a predetermined negative feedback rate threshold.

19 Claims, 5 Drawing Sheets

TRACKING DIAGNOSTIC FOR CONTINUOUSLY VARIABLE VALVE SYSTEMS

TECHNICAL FIELD

The present disclosure relates to a diagnostic strategy for determining the accuracy of an actual position of a variable valve, compared to a commanded position of the variable valve.

INTRODUCTION

An engine control module (ECM) regulates torque output by an automotive engine. The ECM may regulate torque output of the engine to, for example, meet torque demanded by a driver of the vehicle. In some circumstances, combustion within all of the cylinders of the engine may not be necessary to meet the torque demands. Accordingly, the ECM may deactivate one or more of the cylinders of the engine. The ECM may be said to be operating in an active fuel management (AFM) mode during the time that the cylinders are deactivated.

In the engine exhaust system, the noise and back pressure within the exhaust pipe may be changed during the AFM mode. Accordingly, a valve may be implemented within an exhaust pipe to control the back pressure and/or the noise within the exhaust pipe. A continuously variable valve may be used in order to achieve a range of different flow areas. However, it may be difficult to diagnose the correct functioning of a valve whose opening size (flow area) is being continuously changed. If such a valve in the exhaust stream fails to function properly, fuel economy and noise levels may become adverse.

SUMMARY

Accordingly, the present disclosure provides a system and method to diagnose the accuracy in the position of a continuously variable valve by correlating the command and feedback readings. More specifically, the system determines whether the measured position of the valve is within a predetermined range of the commanded position. If not, the system determines whether the rate of change of the measured position exceeds a minimum threshold such that the system is compensating rapidly for the malposition of the valve. If the valve is either within the predetermined range of the commanded position or the magnitude of the rate of change of position is above the minimum threshold, then the system determines that the valve is functioning accurately. If, however, the valve is outside of the predetermined range and the rate of change is low (below the magnitude of the rate of change threshold and not adequately compensating for the improper position), the system determines that the valve is not functioning accurately.

In one form, which may be combined with or separate from the other forms disclosed herein, a method of determining accuracy of a position of a variable valve is provided. The method includes determining a system error, where the system error is the difference between a commanded position of the valve and a measured position of the valve provided through a feedback signal of the valve. The method further includes determining that a diagnostic accuracy passing condition is met if the system error is less than a predetermined positive error threshold and greater than a predetermined negative error threshold. The method also includes determining a rate of change of the measured position, if the system error is not less than the predetermined positive error threshold and greater than the predetermined negative error threshold. The method includes determining that the diagnostic accuracy passing condition is met if the rate of change of the measured position exceeds a predetermined positive feedback rate threshold, and determining that the diagnostic accuracy passing condition is met if the rate of change of the measured position is less than a predetermined negative feedback rate threshold.

In another form, which may be combined with or separate from the other forms disclosed herein, a diagnostic tracking system for tracking accuracy of a position of a variable valve is provided. The diagnostic tracking system includes a system error module configured to determine a system error, the system error being the difference between a commanded position of the valve and a measured position of the valve provided through a feedback signal of the valve. A rate of change module is configured to determine a rate of change of the measured position. A diagnostic accuracy passing module is configured to determine that a diagnostic accuracy passing condition is met if: a) the system error is less than a predetermined positive error threshold and greater than a predetermined negative error threshold; b) the rate of change of the measured position exceeds a predetermined positive feedback rate threshold; or c) the rate of change of the measured position is less than a predetermined negative feedback rate threshold.

In yet another variation, which may be combined with or separate from the other variations provided herein, a variable valve system for a motor vehicle exhaust system is provided. The variable valve system includes a valve moveable between a fully open and a fully closed position, the valve being further moveable into an infinite number of possible positions between the fully open position and the fully closed position. A valve actuator is configured to move the valve into the fully open position, the fully closed position, and therebetween. A sensor is configured to sense a measured position of the valve. A command input is in communication with the valve actuator, the command input being configured to receive a command signal communicating a commanded position of the valve. A feedback output is in communication with the sensor, the feedback output configured to send a feedback signal communicating the measured position of the valve. A control system is configured to provide the command signal to the valve actuator through the command input and to receive the feedback signal through the feedback output. The control system includes a system error module configured to determine a system error, the system error being the difference between the commanded position of the valve and the measured position of the valve. The control system also includes a rate of change module configured to determine a rate of change of the measured position. The control system further includes a diagnostic accuracy passing module configured to determine that a diagnostic accuracy passing condition is met if: a) the system error is less than a predetermined positive error threshold and greater than a predetermined negative error threshold; b) the rate of change of the measured position exceeds a predetermined positive feedback rate threshold (when the system error is greater than the predetermined positive error threshold); or c) the rate of change of the measured position is less than a predetermined negative feedback rate threshold (when the system error is less than the predetermined negative error threshold).

Additional features may also be included with any form disclosed herein, including but not limited to the following: the method, control system, or diagnostic system being further configured to determine that a diagnostic accuracy failure condition is met if: a) the system error is not less than the predetermined positive error threshold and the rate of change of the measured position does not exceed the predetermined positive feedback rate threshold; or b) the system error is not greater than the predetermined negative error threshold and the rate of change of the measured position is not less than the predetermined negative feedback rate threshold; the predetermined positive error threshold and the predetermined negative error threshold being equal in magnitude; the predetermined positive feedback rate threshold and the predetermined negative feedback rate threshold being equal in magnitude; the valve having an infinite number of possible positions between a fully open and a fully closed position; the method, diagnostic system, or control system being configured to determine whether enablement criteria are met prior to performing the steps or modules that determine that the diagnostic accuracy passing condition is met and determine that the diagnostic accuracy failure condition is met; the method, diagnostic system, or control system being configured to delay at least one sampling interval prior to performing the steps or modules that determine that the diagnostic accuracy passing condition is met and determine that the diagnostic accuracy failure condition is met if suspension criteria are met; the suspension criteria including at least one of: a new valve command signal after a steady-state period of the valve command signal and a new valve command signal changing the direction of the valve; the valve being electronically actuatable; and the valve having a Hall-Effect sensor configured to determine the measured position of the valve.

The above features and advantages, and other features and advantages of the present disclosure, will be readily apparent from the following detailed description of the many aspects of the present disclosure when taken in connection with the accompanying drawings and appended claims.

BRIEF DESCRIPTION OF THE DRAWINGS

The drawings are included for illustration only and are not intended to limit the scope of this disclosure or the appended claims.

DETAILED DESCRIPTION

Figure 1:
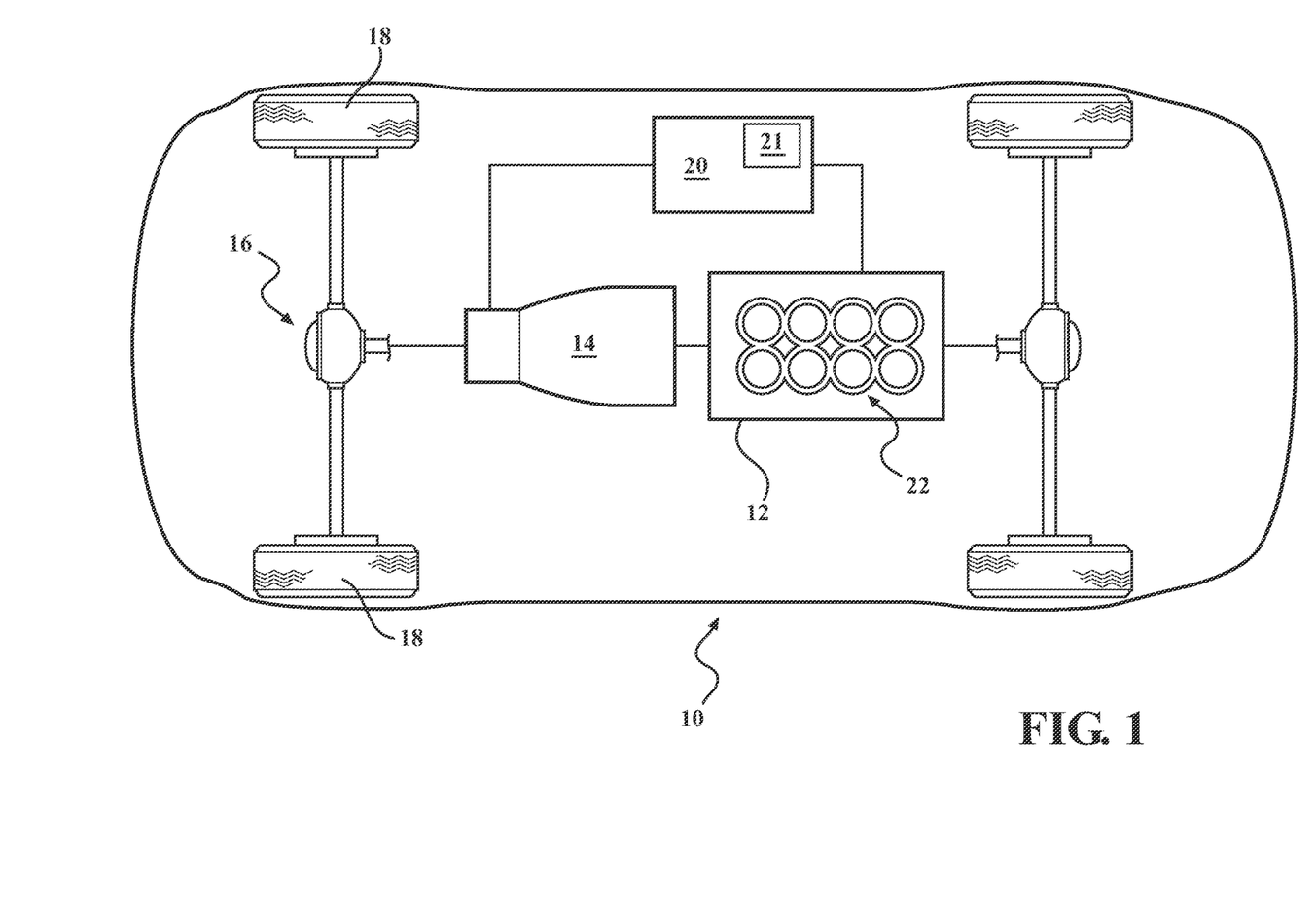
FIG. 1 is a schematic plan view of a motor vehicle system, in accordance with the principles of the present disclosure.

Referring to the drawings, wherein like reference numbers correspond to like or similar components throughout the several figures, a motor vehicle is illustrated and generally designated at 10. The motor vehicle 10 may be any type of vehicle, such as a car, truck, van, sport-utility vehicle, etc.

The motor vehicle 10 includes an engine 12 (which could be an internal combustion engine, an electric engine, or a hybrid, by way of example). The engine 12 is interconnected with a transmission 14 and to a final drive unit 16 to propel a set of wheels 18 of the motor vehicle 10. The transmission 14 may be a stepped transmission having planetary gears, a countershaft transmission, a continuously variable transmission, or an infinitely variable transmission, by way of example. The engine 12 and transmission 14 may be controlled by a control system 20, which may include one or more controllers such as an ECM and TCM (not shown in detail), by way of example.

The engine may have a plurality of cylinders 22, each of which includes a piston (not shown) coupled to a crankshaft (not shown). The crankshaft is configured to move each of the pistons within its own respective cylinder 22. Although the engine 12 is depicted as including eight cylinders 22, the engine 12 may include any desired number of cylinders 22, such as two, three, four, six, or eight, by way of example. Each cylinder 22 is configured to undergo a combustion event to power the motor vehicle 10.

The engine control module (ECM) of the control system 20 may regulate torque output by the engine 12. The ECM may regulate torque output of the engine 12 to, for example, meet torque demanded by a driver of the vehicle 10. In some circumstances, combustion within all of the cylinders 22 of the engine 12 may not be necessary to meet the torque demands. Accordingly, the control system 20 may deactivate one or more of the cylinders 22 of the engine 12. When the control system 20 deactivates one or more cylinders 22, the engine 12 is operating in an active fuel management (AFM) mode.

Figure 2:
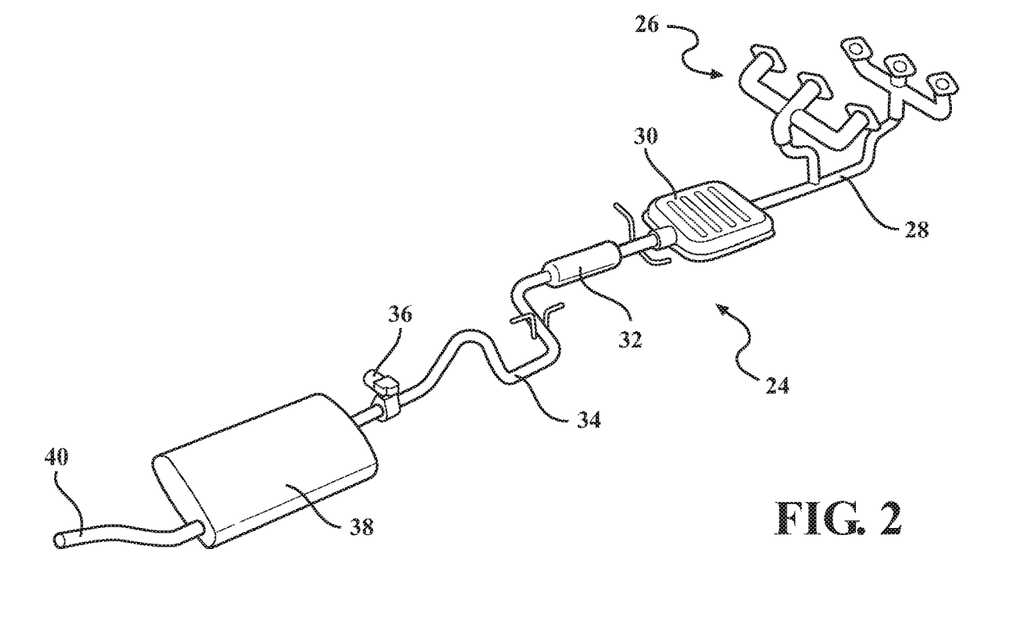
FIG. 2 is an example perspective view of an exhaust system of the motor vehicle system shown in FIG. 1, according to the principles of the present disclosure.

Referring now to FIG. 2, an engine exhaust system is illustrated and generally designated at 24. The engine cylinders 22 (shown in FIG. 1) provide exhaust gas to the exhaust manifold 26. In this example, the exhaust manifold 26 is shown having six exhaust ports for a six-cylinder engineer, but it should be understood that any desirable number of engine cylinders and associated exhaust ports could be used. From the exhaust manifold 26, the exhaust gas may flow through one or more Y pipes 28 to a catalytic converter 30, where the exhaust gas undergoes a redox reaction to reduce emissions. From the catalytic converter 30, the exhaust gas may flow through a resonator 32 and into the exhaust pipe 34.

In the engine exhaust system 24, noise and back pressure within the exhaust pipe 34 may be changed during the AFM mode. Accordingly, a variable valve assembly 36 may be implemented within an exhaust pipe 34 to control the back pressure and/or the noise within the exhaust pipe 34. The variable valve assembly 36 may include a continuously variable valve capable of achieving a range of different flow areas. From the variable valve assembly 36, exhaust gas may then flow into a muffler 38 and out of the tailpipe 40.

The variable valve assembly 36 may be referred to as an AFM valve or an exhaust variable valve, by way of example. The position of the valve assembly 36 may be controlled based on certain inputs known to affect noise, back pressure, and/or fuel economy, by way of example. In some cases, these inputs include engine speed, transmission gear ratio, and pedal position. These inputs can then be used to determine a desirable valve position for the variable valve assembly 36.

Figure 3:
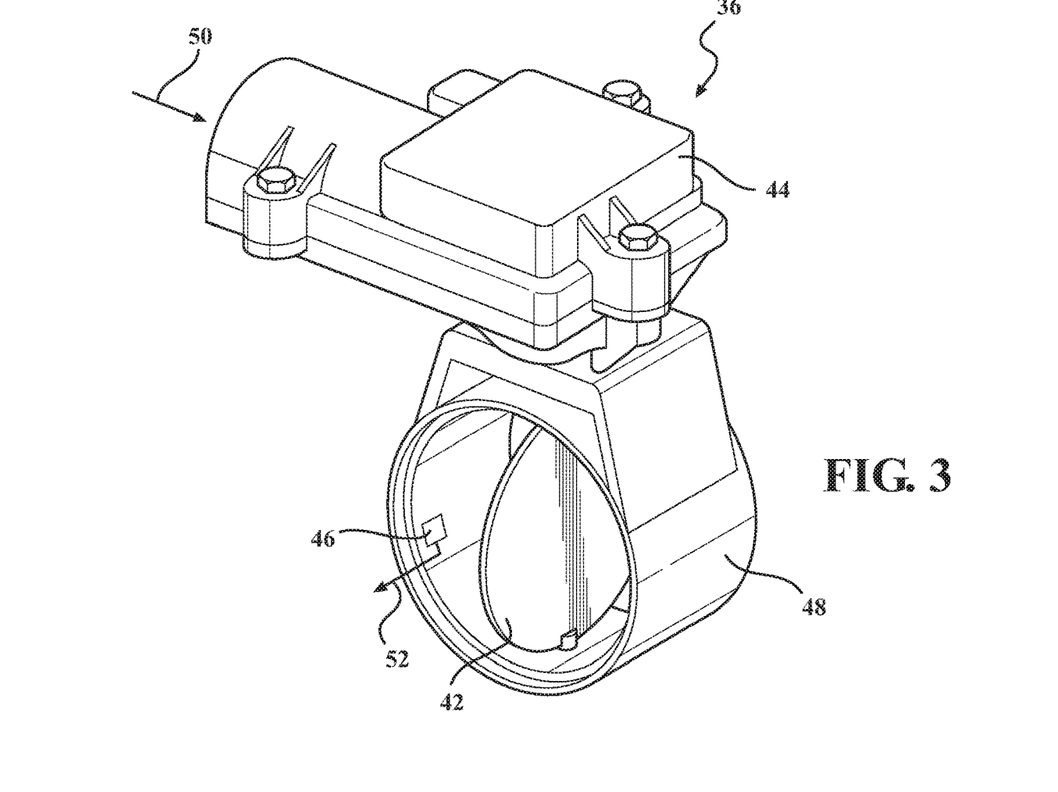
FIG. 3 is a perspective view of a valve assembly of the exhaust system of FIG. 2, in accordance with the principles of the present disclosure.

Referring now to a FIG. 3, an example of the variable valve assembly 36 is shown in greater detail. The variable valve assembly 36 includes a valve 42 moveable between a fully open and a fully closed position, the valve 42 being further moveable into an infinite number of possible positions between the fully open position and the fully closed position. In FIG. 3, the valve 42 is illustrated in the fully open (least obstructive) position. A valve actuator 44 is operable and configured to move the valve 42 into the fully open position, the fully closed position, and therebetween. The valve actuator 44 may be electronic and configured to electronically actuate the valve 42. In some cases, the valve 42 is continuously variable between an infinite number of positions between the fully open position and the fully closed position. A sensor 46 may be attached to the valve 42 or valve housing 48. The sensor 46 is configured to sense the actual position of the valve 42, which may be called the measured position of the valve 42. The sensor 46 may be a Hall Effect sensor, by way of example.

A command input 50 may be in communication with the valve actuator 44, where the command input 50 is configured to receive a command signal communicating a commanded position of the valve 42. A feedback output 52 may be in communication with the sensor 46, the feedback output 52 being configured to send a feedback signal communicating the measured position of the valve 42.

A control system 21 (shown in FIG. 1) is configured to provide the command signal to the valve actuator 44 through the command input 50 and to receive the feedback signal through the feedback output 52. The control system 21 may be part of the vehicle control system 20 or separate therefrom.

Figure 4:
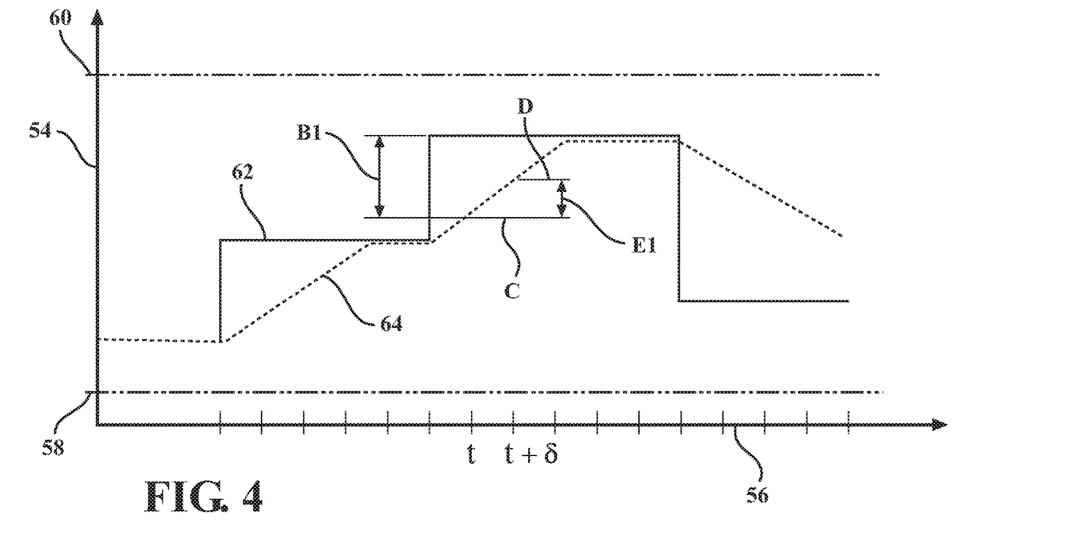
FIG. 4 is a graph illustrating control and feedback signals of the valve assembly shown in FIGS. 2-3, according to the principles of the present disclosure.

Referring now to FIG. 4, a graph shows valve position 54 on a y-axis and time 56 (in seconds) on an x-axis. A fully open position of the valve 42 is shown at 58 and fully closed position is shown at 60. The commanded position of the valve 42 (which is sent through the command signal to the command input 50) is shown at solid line 62. The actual, measured position of the valve 42 (sent through the feedback output 52 as a feedback signal) is shown at dashed line 64.

The control system 21 is configured to determine a system error, which is the difference between the commanded position 62 of the valve 42 and the measured position 64 of the valve 42. For example, at time t, the system error has a value B1. The control system 21 may also be configured to determine a rate of change of the measured position. For example, the control system 21 determines the valve positions at time t (value C) and at time t+δ (value D) and subtracts value C from value D to find a feedback difference E1. The feedback difference E1 is then divided by δ to determine the rate of change of the measured position between time t and time t+δ.

Figure 5:
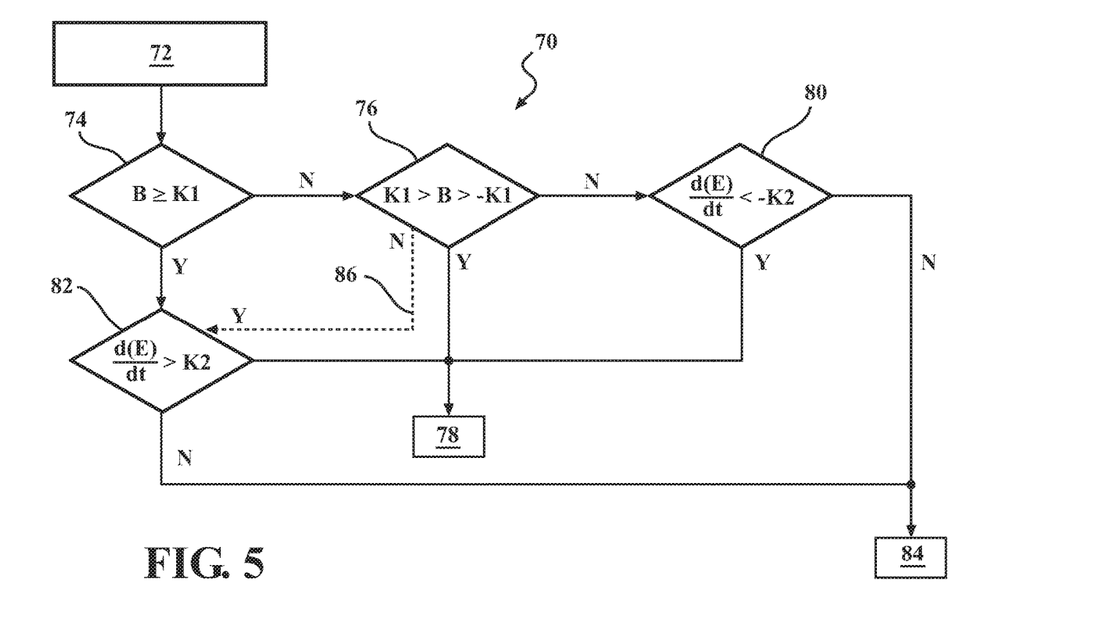
FIG. 5 is a block diagram illustrating a method of determining accuracy of a position of a variable valve, such as the valve assembly shown in FIGS. 2-3, in accordance with the principles of the present disclosure.

Referring now to FIG. 5, a method of determining accuracy of a position of the variable valve 42 is illustrated and generally designated at 70. The method 70 may be implemented by the control system 21, by way of example. The method 70 begins at block 72, where the method 70 includes determining the system error B at a point in time, where the system error B is the difference between the commanded position of the valve 42 and the measured position of the valve 42, as explained above.

The method 70 may then proceed to decision block 74 to determine whether the system error B is greater than or equal to a predetermined positive error threshold K1. The predetermined positive error threshold K1 is a constant that is calibrated into the system and is a reasonable amount of error that is allowed to exist in a positive direction (or a first direction) between the commanded position of the valve 42 and the measured position of the valve 42.

If the system error B is not greater than or equal to the predetermined positive error threshold K1, the method 70 may then proceed to decision block 76. In decision block 76, the method 70 determines whether the system error B is less than the predetermined positive error threshold K1 and greater than a predetermined negative error threshold −K1. The predetermined negative error threshold −K1 is a constant that is calibrated into the system and is a reasonable amount of error that is allowed to exist in a negative direction (or a second direction) between the commanded position of the valve 42 and the measured position of the valve 42. In some cases, the step 74 may be omitted, and the method 70 may proceed from step 72 directly to step 76.

If the method 70 determines in decision block 76 that the system error B is in fact less than the predetermined positive error threshold K1 and greater than a predetermined negative error threshold −K1, the method 70 proceeds to step 78 to determine that a diagnostic accuracy passing condition is met. If, however, the method 70 determines in the decision block 76 that the system error B is not less than the predetermined positive error threshold K1 and greater than the predetermined negative error threshold −K1, the method 70 may proceed to decision block 80. The method 70 may also simultaneously proceed to decision block 82 if the step 74 is not included.

In decision block 80, the method 70 includes determining a rate of change of the measured position d(E)/dt and determining whether the rate of change of the measured position d(E)/dt is less than a predetermined negative feedback rate threshold −K2. The predetermined negative feedback rate threshold −K2 is a threshold that is calibrated into the system and which delineates whether the position of the valve 42 is being changed at a high enough rate in order to bring the valve 42 within the acceptable error thresholds (between −K1 and K1) in a reasonable predetermined time frame. If the rate of change d(E)/dt is not very fast, this would mean that the valve position is not being accurately controlled. In block 80, the method 70 determines whether the rate of change d(E)/dt is below the predetermined negative feedback rate threshold −K2. In this case, the lower the rate below −K2, the faster that the control of the valve position is being compensated in the negative direction. Accordingly, if the method 70 determines in block 80 that the rate of change d(E)/dt is less than the predetermined negative feedback rate threshold −K2, the method 70 proceeds to step 78 to determine that the diagnostic accuracy passing condition is met.

If, however, it is determined in block 80 that the rate of change d(E)/dt is not less than the predetermined negative feedback rate threshold −K2, the method 70 proceeds to block 84, where the method 70 determines that a diagnostic accuracy failure condition is met. This is because in block 76, it was determined that the valve 42 was outside of the acceptable position error threshold in a negative direction, and the rate of change d(E)/dt of the valve 42 is not below the negative feedback rate threshold −K2, signifying that the system is not adequately compensating for the erroneous position of the valve 42.

If step 74 was used, and the method 70 determined that the system error B was not less than the predetermined positive error threshold K1, the method 70 would then proceed to block 82. If step 74 was not used, then method 70 proceeds from block 76 along path 86 to block 82, simultaneously with proceeding to block 80 from block 76.

In decision block 82, the method 70 includes determining a rate of change of the measured position d(E)/dt and determining whether the rate of change of the measured position d(E)/dt exceeds (is greater than) a predetermined positive feedback rate threshold K2. The predetermined positive feedback rate threshold K2 is a threshold that is calibrated into the system and which delineates whether the position of the valve 42 is being changed at a high enough rate in order to bring the valve 42 within the acceptable error thresholds (between −K1 and K1) within a reasonable predetermined time frame. If the rate of change d(E)/dt is not very fast, this would mean that the valve position is not being accurately controlled. In block 82, the method 70 determines whether the rate of change d(E)/dt is above the predetermined positive feedback rate threshold K2. In this case, the higher the rate above K2, the faster that the control of the valve position is being compensated in the positive direction. Accordingly, if the method 70 determines in block 82 that the rate of change d(E)/dt is greater than the predetermined positive feedback rate threshold K2, the method 70 proceeds to step 78 to determine that the diagnostic accuracy passing condition is met.

If, however, it is determined in block 82 that the rate of change d(E)/dt is not greater than the predetermined positive feedback rate threshold K2, the method 70 proceeds to block 84, where the method 70 determines that a diagnostic accuracy failure condition is met. This is because in block 74 or 76, it was determined that the valve 42 was outside of the acceptable position error threshold in a positive direction, and the rate of change d(E)/dt of the valve 42 is not above the positive feedback rate threshold K2, signifying that the system is not adequately compensating for the erroneous position of the valve 42.

In some forms of the method 70, the rate of change d(E)/dt of the measured position of the valve 42 is only determined if the valve position is outside of the acceptable threshold between K1 and K2, as determined by steps 74 and 76. This is because the rate of change d(E)/dt is not needed to determine that the diagnostic accuracy passing condition is met, when the system error B is within the bounds of K1 and −K1.

As can be seen in FIG. 5, the diagnostic accuracy failure condition is not met unless: a) the system error B is not less than the predetermined positive error threshold K1 and the rate of change d(E)/dt of the measured position does not exceed the predetermined positive feedback rate threshold K2; or b) the system error B is not greater than the predetermined negative error threshold −K2 and the rate of change d(E)/dt of the measured position is not less than the predetermined negative feedback rate threshold −K2.

In some cases, the predetermined positive error threshold K1 and the predetermined negative error threshold −K1 are equal in magnitude. In addition, the predetermined positive feedback rate threshold K2 and the predetermined negative feedback rate threshold −K2 may be equal in magnitude.

Figure 6:
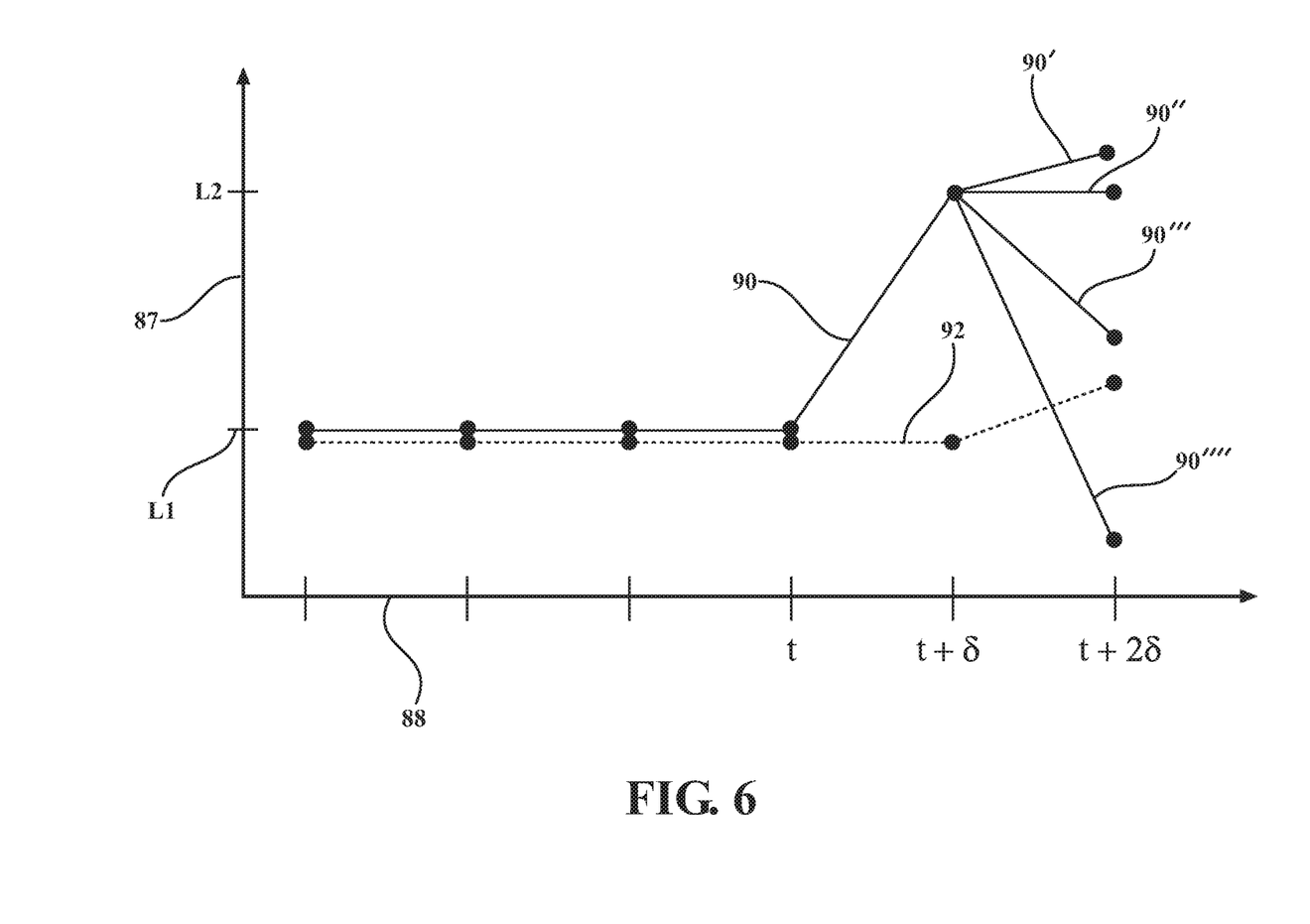
FIG. 6 is a graph illustrating a feedback signal and several options for command signals of the valve assembly of FIGS. 2-3, in accordance with the principles of the present disclosure.

Referring now to FIG. 6, a graph is illustrated showing valve position 87 on a y-axis and time 88 (in seconds) on an x-axis. The commanded valve position is shown at solid line 90. The feedback of the measured position of the valve 42 (sent through the feedback output 52 as a feedback signal) is shown at dashed line 92. At time t, the commanded position 90 of the valve 42 is increased from a first position L1 to a second position L2 steadily over a time period δ, however, it may take up to the time period δ for an interior controller in the valve actuator 44 to implement the new valve command. In this case, the sampling interval for the feedback signal of the measured position 92 is also δ. Since the new command may not be updated until the time period δ after receiving the new command, the measured position 92 of the valve 42 will not begin to change until time t+δ, as shown in FIG. 6. Accordingly, it would not make sense to run the accuracy determination method or diagnostic until at least after the time period δ has elapsed; in other words, at or after t+δ.

Therefore, the method 70 may include a step of suspending the diagnostic and delaying for a predetermined delay time frame, such as δ, prior to performing the steps of determining that the diagnostic accuracy passing condition is met and determining that the diagnostic accuracy failure condition is met.

Further, the method 70 may be configured to delay for the delay timeframe under certain circumstances, but not others. For example, the method 70 may determining whether suspension criteria are met for delaying, or suspending the diagnostic, for the delay timeframe δ. In FIG. 6, the graph shows the command signal 90 in a steady state prior to time t. In this case, the method 70 should delay for the timeframe δ prior to running the diagnostic again at time t+δ. In other words, the diagnostic should be delayed when a new command signal is received after a steady-state period of the valve command signal 90; otherwise, the diagnostic would inaccurately determine that the failure condition is met at time t+δ without giving the system adequate time to move the valve 42 toward the commanded position 90.

In addition, the graph in FIG. 6 shows four scenarios for the command signal 90 after time t+δ, at time t+2δ. In a first scenario, the command signal 90' commands that the valve 42 be opened further in a positive direction than the position L2, which has the effect of moving the valve 42 toward a less-open state in the positive direction. In a second scenario, the command signal 90" commands that the valve 42 remain at the same command as at time t+δ, which is position L2. In a third scenario, the command signal 90''' commands that the valve 42 remain open in the same direction as at time t+δ, at a higher magnitude of opening in the positive direction, which is closer to the midpoint (fully open). Finally, in a fourth scenario, the command signal 90'''' commands that the valve 42 changes direction.

The method 70 could be configured to suspend the diagnostic (or delay for the timeframe δ) only in the fourth scenario of these four examples, where the valve 42 has changed direction and so the feedback signal will likely fail based on the measured position 90 because the command changing direction has not yet been fully implemented in the timeframe δ, and thus, the valve 42 is tracking toward the commanded position at time t+δ further in the positive direction. However, in scenarios 1-3, the valve 42 is already moving in a transient state, and even if the command changes as in scenarios 1 and 3, the diagnostic could continue without being delayed because the valve 42 is already being moved in the same direction as the new command.

In sum, in some versions of the method 70, the method 70 includes determining whether suspension criteria are met for suspending the diagnostic, and the suspension criteria includes at least one of: a) a new valve command signal after a steady-state period of the valve command signal; and b) a new valve command signal changing the direction of the valve. If the suspension criteria are met, the method 70 includes delaying at least one sampling interval δ prior to performing the steps of determining that the diagnostic accuracy passing condition is met and determining that the diagnostic accuracy failure condition is met.

Figure 7:
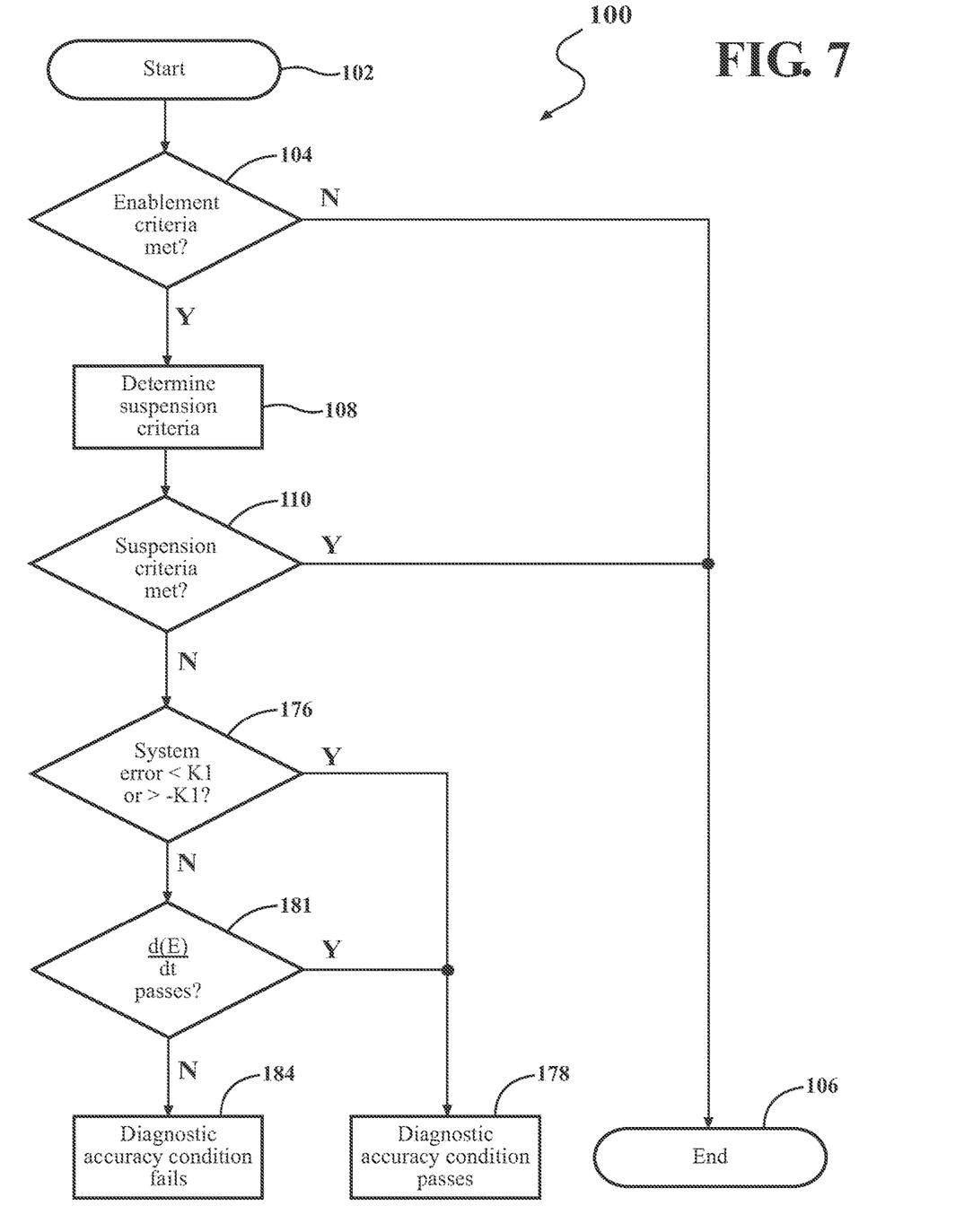
FIG. 7 is a block diagram illustrating another variation of a method of determining accuracy of a position of a variable valve, such as the valve assembly shown in FIGS. 2-3, in accordance with the principles of the present disclosure.

Referring now to FIG. 7, another version of a method of determining accuracy of a position of the variable valve 42 is illustrated and generally designated at 100. The method 100 may be implemented by the control system 21, by way of example. The method 100 may be similar to the method 70 illustrated in FIG. 5, except where differences are described. The method 100 begins at a start block 102. From the start block 102, the method 100 proceeds to a decision block 104 that determines whether enablement criteria are met, prior to performing the steps of determining that the diagnostic accuracy passing condition is met and determining that the diagnostic accuracy failure condition is met. For example, it may be desirable to have certain enablement criteria that need to be met before even beginning to run the rest of the steps to determine if the valve 42 is behaving accurately according to the commanded positions. These enablement criteria could be, for example, requirements that the engine be on and that the battery be sufficiently charged. Any other desired enablement criteria could additionally or alternatively be used. If the enablement criteria are not met, the method 100 proceeds to an end step 106. The method 100 may then be started over at the start block 102.

If the enablement criteria are met, the method proceeds to step 108, where the method 100 includes determining suspension criteria for suspending the diagnostic. The suspension criteria may include, for example, one or more of the following: a new valve command signal after a steady-state period of the valve command signal; and a new valve command signal changing the direction of the valve 42 (as illustrated and described with respect to FIG. 6). Thus, in step 108, the method 100 may include determining whether the command signal is changing from a steady-state commanded position to a new commanded position having a value different than the steady-state commanded position, within the last delay timeframe δ. The method 100 may also determine in step 108 whether a new command signal changes the direction of the previous command.

The method 100 then proceeds to decision block 110 to determine whether any of these suspension criteria are met, and if so, the method 100 proceeds to the ending block 106 to end the method 100. The method 100 then resumes and starts over at step 102 until the suspension criteria are not met in step 108. This results in a delay for a timeframe δ in circumstances where the command signal has changed from the steady state to a different commanded position within the last delay timeframe δ or if the commanded position has changed direction, as explained above with respect to FIG. 6. Thus, if the suspension criteria are met, the method 100 may include delaying at least one sampling interval δ prior to performing the steps of determining that the diagnostic accuracy passing condition is met and determining that the diagnostic accuracy failure condition is met, which occur later in the method 100.

If the method 100 determines in block 110 that the suspension criteria are not met, the method 100 proceeds to decision block 176. Decision block 176 is similar to decision block 76 described above in FIG. 5. In decision block 176, the method 100 may determine the system error B, as explained above with respect to FIG. 4, and then may determine whether the system error B is less than a predetermined positive error threshold K1 and greater than a predetermined negative error threshold −K1.

If the method 100 determines in decision block 176 that the system error B is in fact less than the predetermined positive error threshold K1 and greater than a predetermined negative error threshold −K1, the method 100 proceeds to step 178 to determine that a diagnostic accuracy passing condition is met. If, however, the method 100 determines in decision block 176 that the system error B is not less than the predetermined positive error threshold K1 and greater than the predetermined negative error threshold −K1, the method 100 may proceed to decision block 181.

In decision block 181, the method 70 includes determining a rate of change of the measured position $d(E)/dt$ and determining whether the rate of change of the measured position $d(E)/dt$ meets a rate of change passing requirement. If the rate of change $d(E)/dt$ is less than a predetermined negative feedback rate threshold −K2 or higher than a predetermined negative feedback rate threshold K2, the rate of change passing requirement is met. The predetermined feedback rate thresholds −K2 and K2 are thresholds that are calibrated into the system and which delineate whether the position of the valve 42 is being changed at a high enough rate in order to bring the valve 42 within the acceptable error thresholds (between −K1 and K1) in a reasonable predetermined time frame. If the rate of change $d(E)/dt$ is not very fast, this would mean that the valve position is not being accurately controlled. In this case, the lower the rate below −K2, the faster that the control of the valve position is being compensated in the negative direction; and the higher the rate above K2, the faster that the control of the valve position is being compensated in the positive direction. Accordingly, if the method 100 determines in block 181 that the rate of change $d(E)/dt$ meets the rate of change passing requirement, the method 100 proceeds to step 178 to determine that the diagnostic accuracy passing condition is met.

If, however, it is determined in block 181 that the rate of change $d(E)/dt$ does not meet the passing requirement (i.e., the rate of change $d(E)/dt$ is not less than the predetermined negative feedback rate threshold −K2 or greater than the predetermined positive feedback rate threshold K2), the method 100 proceeds to block 184, where the method 100 determines that a diagnostic accuracy failure condition is met. This is because in block 176, it was determined that the valve 42 was outside of the acceptable position error threshold in a positive or negative direction, and the rate of change $d(E)/dt$ of the valve 42 is not below the negative feedback rate threshold −K2 or above the positive feedback rate threshold K2, signifying that the system is not adequately compensating for the erroneous position of the valve 42.

A diagnostic tracking system or control system 21 may be implemented to perform the steps of the methods 70, 100 described above. For example, a diagnostic tracking system or control system 21 may include a system error module configured to determine the system error (the system error being the difference between a commanded position of the valve 42 and the measured position of the valve 42 provided through the feedback signal). The diagnostic system or control system 21 may also include a rate of change module configured to determine the rate of change of the measured position and a diagnostic accuracy passing module configured to determine that a diagnostic accuracy passing condition is met if: a) the system error is less than a predetermined positive error threshold and greater than a predetermined negative error threshold; b) the rate of change of the measured position exceeds the predetermined positive feedback rate threshold; or c) the rate of change of the measured position is less than the predetermined negative feedback rate threshold.

The diagnostic tracking system or control system 21 may further include a diagnostic accuracy failure module configured to determine that a diagnostic accuracy failure condition is met if: a) the system error is not less than the predetermined positive error threshold and the rate of change of the measured position does not exceed the predetermined positive feedback rate threshold; or b) the system error is not greater than the predetermined negative error threshold and the rate of change of the measured position is not less than the predetermined negative feedback rate threshold.

In some forms, the diagnostic tracking system and/or control system 21 may also include an enablement module configured to determine whether enablement criteria are met prior to activating the diagnostic accuracy passing module and the diagnostic accuracy failure module. Further, the diagnostic tracking system and/or control system 21 may include a delay module configured to delay at least one sampling interval after a new valve command signal prior to activating the diagnostic accuracy passing module and the diagnostic accuracy failure module, under certain conditions, such as when suspension criteria are met for suspending the diagnostic. The suspension criteria may include, for example, a new valve command signal after a steady-state period of the valve command signal, and/or a new valve command signal changing the direction of the valve.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component may be capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality.

Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms can include any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event.

Communication between controllers, and communication between controllers, actuators and/or sensors may be accomplished using a direct wired link, a networked communication bus link, a wireless link or any another suitable communication link. Communication includes exchanging data signals in any suitable form, including, for example, electrical signals via a conductive medium, electromagnetic signals via air, optical signals via optical waveguides, and the like.

Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The control system 21 may be configured to execute each of the steps of the methods 70, 100. Thus, the entire description with respect to FIGS. 1-7 may be applied by the control system 21 to effectuate the methods 70, 100 shown in FIGS. 5 and 7. Furthermore, the control system 21 may be or include a controller that includes a number of control logics that are configured to execute the steps of the methods 70, 100.

The controller(s) of the control system 21 may include a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the many aspects of the present disclosure. While certain aspects have been described in detail, various alternative aspects exist for practicing the invention as defined in the appended claims.

What is claimed is:

1. A method of determining accuracy of a position of a variable valve in an exhaust system of a motor vehicle, the method comprising:
   determining a system error, the system error being a difference between a commanded position of the valve and a measured position of the valve provided through a feedback signal of the valve;
   determining, via a controller, that a diagnostic accuracy passing condition is met if the system error is less than a predetermined positive error threshold and greater than a predetermined negative error threshold;

determining, via the controller, a rate of change of the measured position, if the system error is not less than the predetermined positive error threshold and greater than the predetermined negative error threshold;

determining, via the controller, that the diagnostic accuracy passing condition is met if the rate of change of the measured position exceeds a predetermined positive feedback rate threshold; and determining, via the controller, that the diagnostic accuracy passing condition is met if the rate of change of the measured position is less than a predetermined negative feedback rate threshold.

2. The method of claim 1, further comprising determining, via the controller, that a diagnostic accuracy failure condition is met if:
a) the system error is not less than the predetermined positive error threshold and the rate of change of the measured position does not exceed the predetermined positive feedback rate threshold; or
b) the system error is not greater than the predetermined negative error threshold and the rate of change of the measured position is not less than the predetermined negative feedback rate threshold.

3. The method of claim 2, wherein the predetermined positive error threshold and the predetermined negative error threshold are equal in magnitude, and wherein the predetermined positive feedback rate threshold and the predetermined negative feedback rate threshold are equal in magnitude.

4. The method of claim 3, further comprising providing the valve having an infinite number of possible positions between a fully open position and a fully closed position.

5. The method of claim 4, further comprising determining, via the controller, whether enablement criteria are met prior to performing the steps of determining that the diagnostic accuracy passing condition is met and determining that the diagnostic accuracy failure condition is met.

6. The method of claim 5, further comprising:
determining, via the controller, whether suspension criteria are met for suspending the diagnostic, the suspension criteria including at least one of: a new valve command signal after a steady-state period of the valve command signal and a new valve command signal changing the direction of the valve; and
if the suspension criteria are met, delaying at least one sampling interval prior to performing the steps of determining that the diagnostic accuracy passing condition is met and determining that the diagnostic accuracy failure condition is met.

7. The method of claim 6, further comprising providing the valve as being electronically actuatable and having a Hall-Effect sensor configured to determine the measured position of the valve.

8. A diagnostic tracking system for tracking accuracy of a position of a variable valve in an exhaust system of a motor vehicle, the diagnostic tracking system comprising:
a system error module configured to determine a system error, the system error being the difference between a commanded position of the valve and a measured position of the valve provided through a feedback signal of the valve;
a rate of change module configured to determine a rate of change of the measured position;

a diagnostic accuracy passing module configured to determine that a diagnostic accuracy passing condition is met if at least one of
a) the system error is less than a predetermined positive error threshold and greater than a predetermined negative error threshold;
b) the rate of change of the measured position exceeds a predetermined positive feedback rate threshold; and
c) the rate of change of the measured position is less than a predetermined negative feedback rate threshold.

9. The diagnostic tracking system of claim 8, further comprising a diagnostic accuracy failure module configured to determine that a diagnostic accuracy failure condition is met if:
a) the system error is not less than the predetermined positive error threshold and the rate of change of the measured position does not exceed the predetermined positive feedback rate threshold; or
b) the system error is not greater than the predetermined negative error threshold and the rate of change of the measured position is not less than the predetermined negative feedback rate threshold.

10. The diagnostic tracking system of claim 9, wherein the predetermined positive error threshold and the predetermined negative error threshold are equal in magnitude, and wherein the predetermined positive feedback rate threshold and the predetermined negative feedback rate threshold are equal in magnitude.

11. The diagnostic tracking system of claim 10, further comprising an enablement module configured to determine whether enablement criteria are met prior to activating the diagnostic accuracy passing module and the diagnostic accuracy failure module.

12. The diagnostic tracking system of claim 11, further comprising a delay module configured to:
determine whether suspension criteria are met for suspending the diagnostic, the suspension criteria including at least one of: a new valve command signal after a steady-state period of the valve command signal and a new valve command signal changing the direction of the valve; and
if the suspension criteria are met, delay at least one sampling interval prior to activating the diagnostic accuracy passing module and the diagnostic accuracy failure module.

13. The diagnostic tracking system of claim 12, wherein the valve has an infinite number of possible positions between a fully open and a fully closed position, the valve being electronically actuatable and having a Hall-Effect sensor configured to determine the measured position of the valve.

14. A variable valve system for a motor vehicle exhaust system, the variable valve system comprising:
a valve moveable between a fully open and a fully closed position, the valve being further moveable into an infinite number of possible positions between the fully open position and the fully closed position;
a valve actuator configured to move the valve into the fully open position, the fully closed position, and therebetween;
a sensor configured to sense a measured position of the valve;
a command input in communication with the valve actuator, the command input being configured to receive a command signal communicating a commanded position of the valve;

a feedback output in communication with the sensor, the feedback output configured to send a feedback signal communicating the measured position of the valve;

a control system configured to provide the command signal to the valve actuator through the command input and to receive the feedback signal through the feedback output, the control system comprising:

a system error module configured to determine a system error, the system error being the difference between the commanded position of the valve and the measured position of the valve;

a rate of change module configured to determine a rate of change of the measured position;

a diagnostic accuracy passing module configured to determine that a diagnostic accuracy passing condition is met if at least one of a) the system error is less than a predetermined positive error threshold and greater than a predetermined negative error threshold;

b) the rate of change of the measured position exceeds a predetermined positive feedback rate threshold; and c) the rate of change of the measured position is less than a predetermined negative feedback rate threshold.

15. The variable valve system of claim 14, the control system further comprising a diagnostic accuracy failure module configured to determine that a diagnostic accuracy failure condition is met if:

a) the system error is not less than the predetermined positive error threshold and the rate of change of the measured position does not exceed the predetermined positive feedback rate threshold; or b) the system error is not greater than the predetermined negative error threshold and the rate of change of the measured position is not less than the predetermined negative feedback rate threshold.

16. The variable valve system of claim 15, wherein the predetermined positive error threshold and the predetermined negative error threshold are equal in magnitude, and wherein the predetermined positive feedback rate threshold and the predetermined negative feedback rate threshold are equal in magnitude.

17. The variable valve system of claim 16, the control system further comprising an enablement module configured to determine whether enablement criteria are met prior to activating the diagnostic accuracy passing module and the diagnostic accuracy failure module.

18. The variable valve system of claim 17, the control system further comprising a delay module configured to:

determine whether suspension criteria are met for suspending the diagnostic, the suspension criteria including at least one of: a new valve command signal after a steady-state period of the valve command signal and a new valve command signal changing the direction of the valve; and if the suspension criteria are met, delay at least one sampling interval prior to activating the diagnostic accuracy passing module and the diagnostic accuracy failure module.

19. The variable valve system of claim 18, the valve actuator being configured to electronically actuate the valve, the sensor being a Hall-Effect sensor.

* * * * *